Patented Jan. 12, 1954

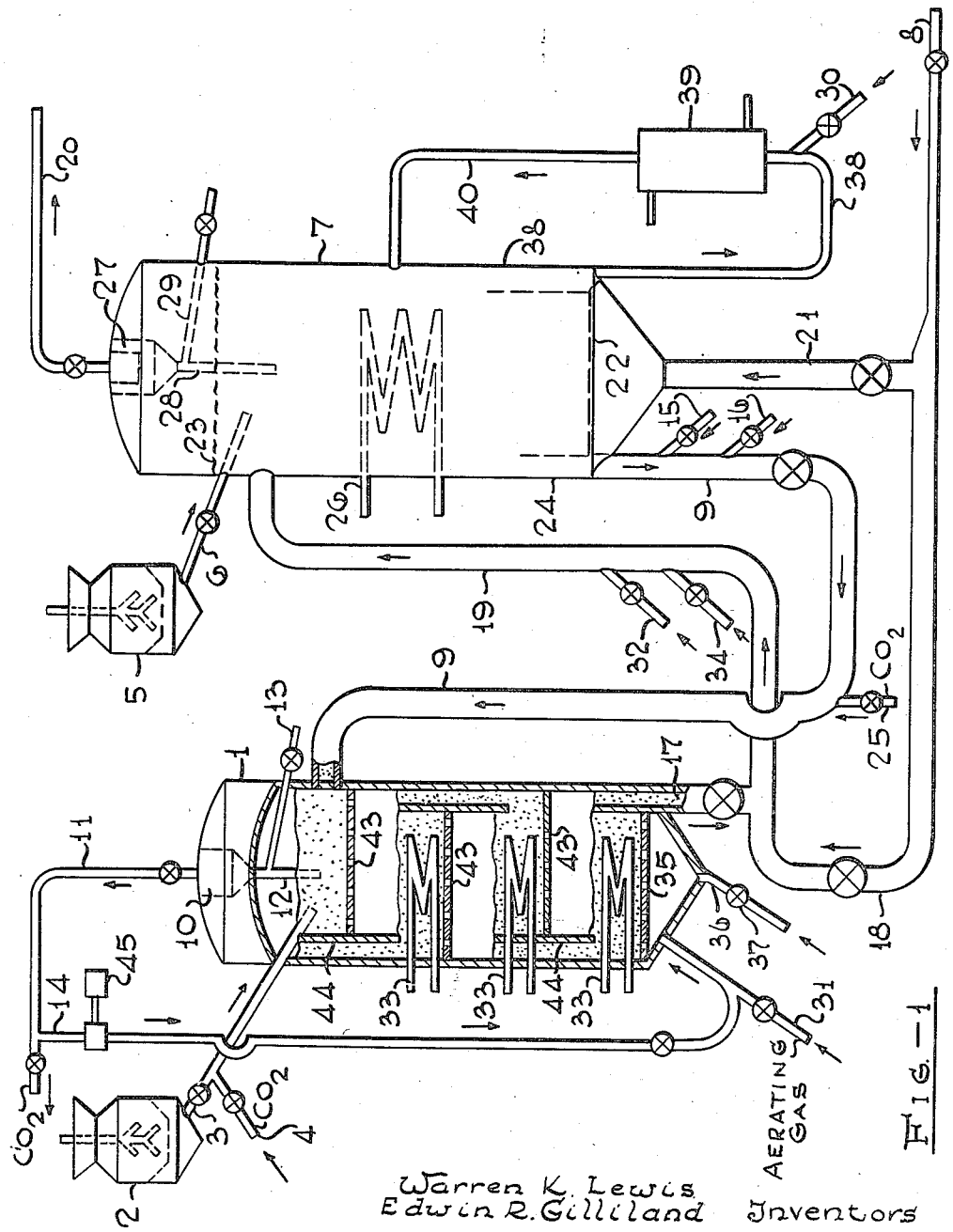

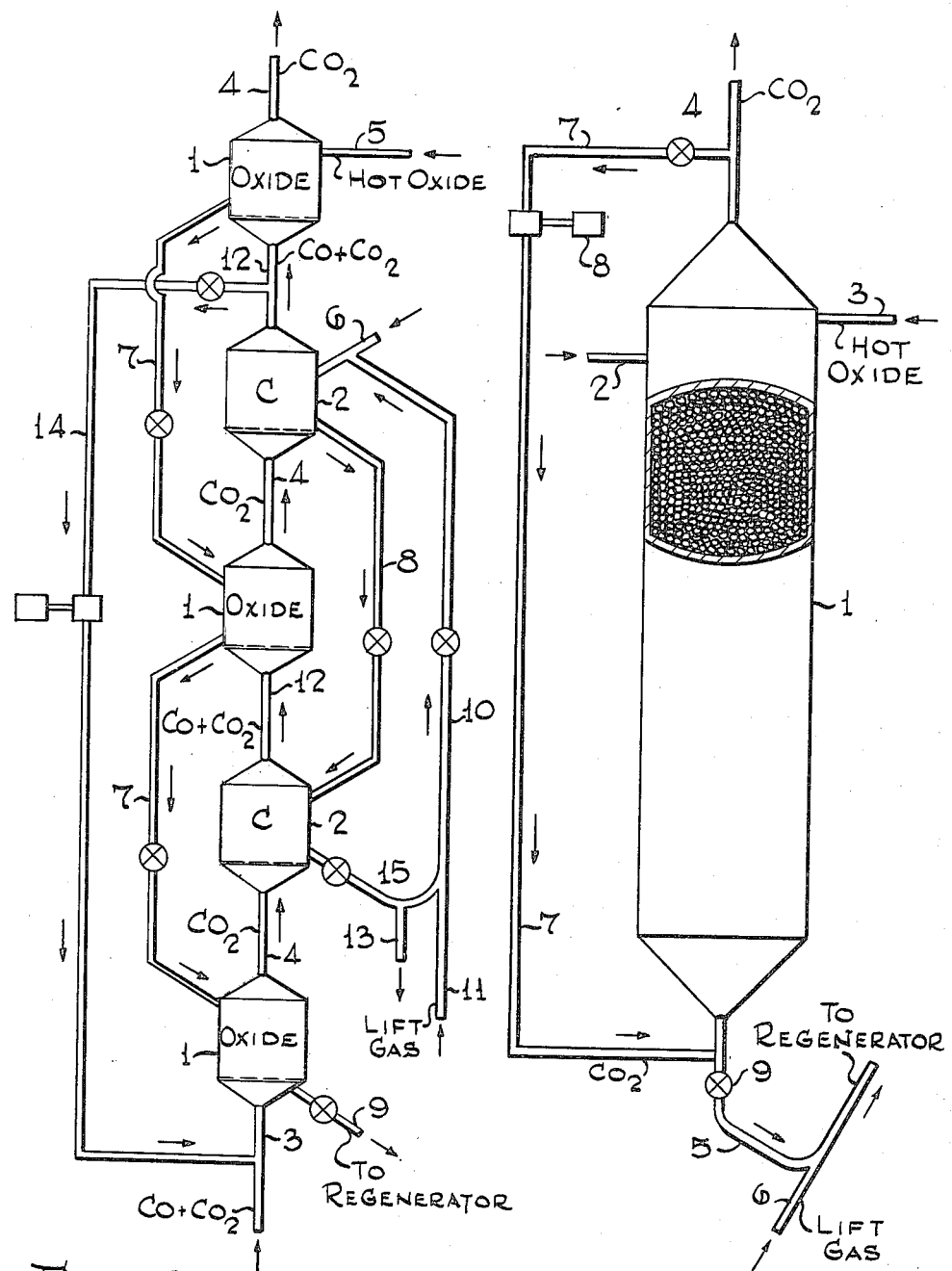

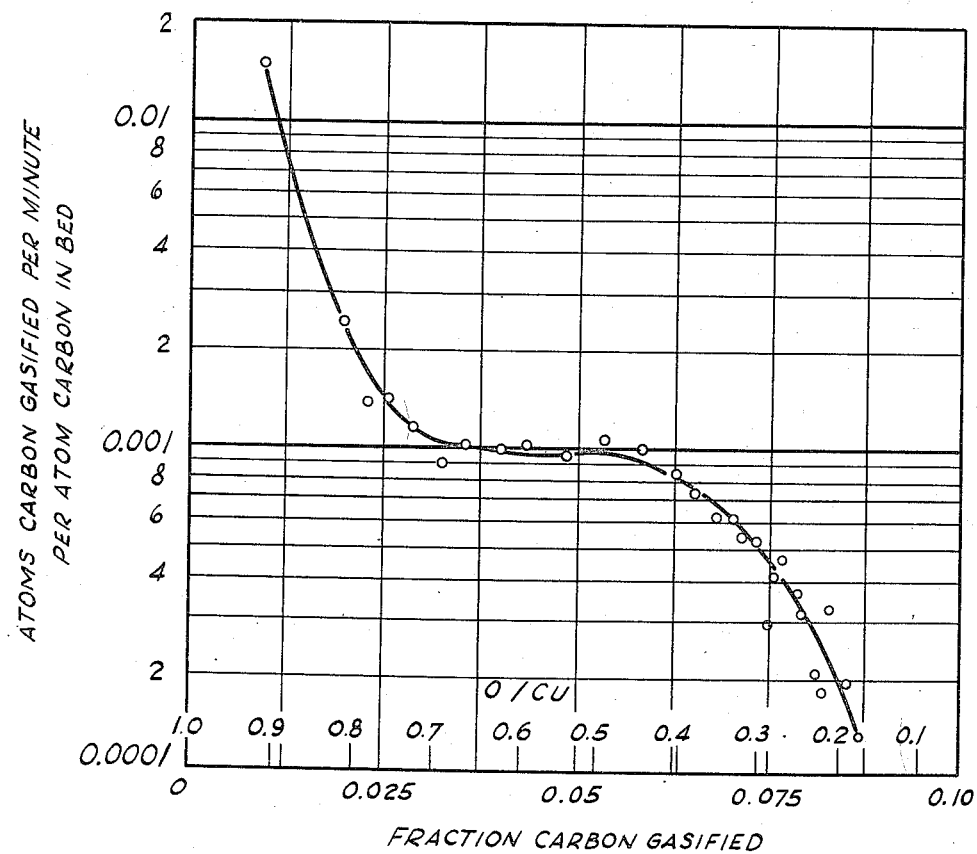

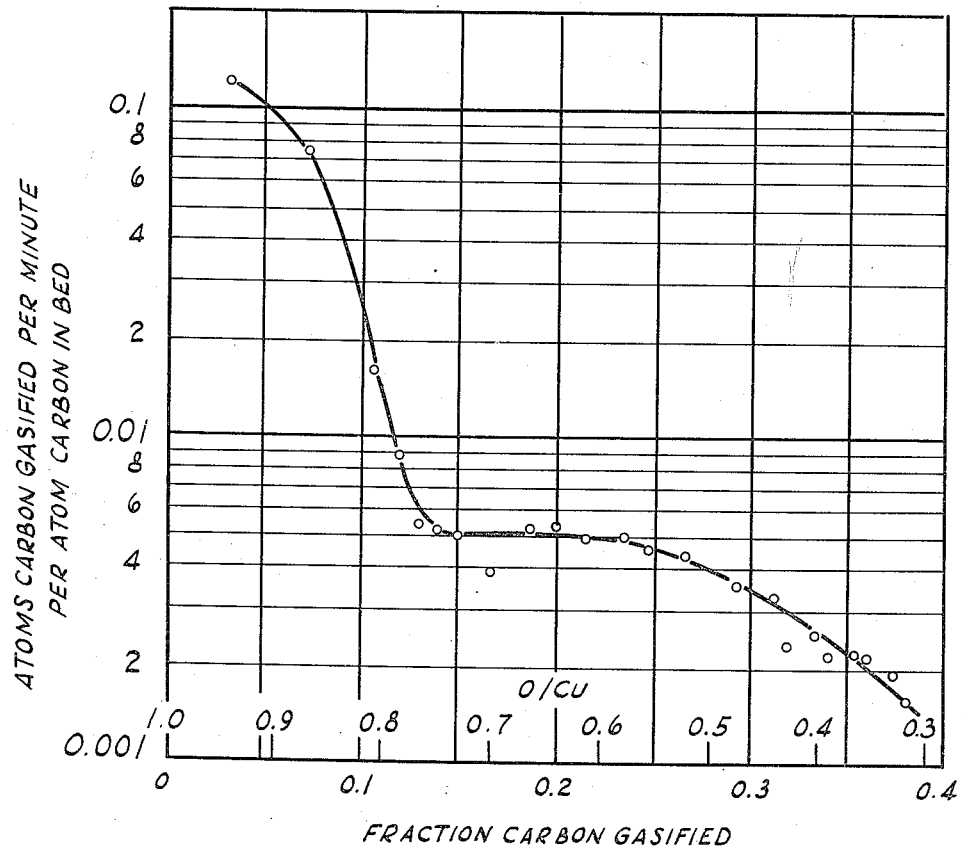

2,665,972

UNITED STATES PATENT OFFICE 2,665,972

PRODUCTION OF PURE CARBON DIOXIDE

Warren K. Lewis, Newton, and Edwin R. Gilliland, Arlington, Mass., assignors to Standard Oil Development Company, a corporation of Delaware Application November 13, 1950, Serial No. 195,262

6 Claims. (Cl. 23—150)

This application is a continuation-in-part of U. S. Application, Serial No. 92,812, filed May 12, 1949.

This invention relates to the production of pure carbon dioxide from oxidizable carbonaceous material, and particularly to the production of carbon dioxide free of inert gases, such as nitrogen. More particularly, the invention is concerned with the oxidation of carbonaceous material by means of solid oxidized copper as the source of oxygen.

At present there are two chief industrial sources of carbon dioxide, namely, as by-products from alcohol fermentation and as recovery from flue gases. The carbon dioxide produced in the former process is pure and cheap but limited in amount. The latter source requires absorption of the $CO_2$ in carbonate solutions followed by boiling to release the pure gas. This operation is perfectly workable but cumbersome and consumes very large quantities of heat. The amount of heat required for recovery of $CO_2$ from flue gas is so large that it is not uncommon to burn extra fuel over and above that necessary to make the $CO_2$. A cheap source of $CO_2$ is, therefore, highly desirable.

In the production of flue gas, the oxidizing agent generally employed is air. The use of air introduces into the product gas large amounts of inert gases, such as nitrogen, which complicate the concentration of $CO_2$ by condensation or absorption.

It is, therefore, the principal object of this invention to provide an improved process for producing pure carbon dioxide with the aid of solid oxidizing materials possessing the necessary oxidation potential as the oxygen transfer agent under controlled reaction conditions.

It is a further object of this invention to provide a process for the conversion of oxidizable carbonaceous material, particularly, finely-divided coal and coke to carbon dioxide.

A more specific object of this invention is to provide a process of the type specified which will permit oxidation of the carbonaceous material by oxidized copper, without contaminating the carbon dioxide with inert gases, such as nitrogen.

It is also an object of this invention to produce carbon dioxide under pressure, thus minimizing the problems of compressing the carbon dioxide.

These and other objects of the invention will be apparent from the description to follow.

The source of carbon from which the carbon dioxide is prepared may be any oxidizable carbonaceous material, such as charcoal, coal, coke, heavy distillate oil, residual oils, gaseous hydrocarbons such as methane, natural gas, etc., peat, shale, oil sands, lignite, bitumen, etc. Charcoal and coke are the preferred solid starting materials, particularly coke and charcoal of low ash content. Charcoal fines and coke breeze are particularly suitable. Methane and natural gas are the preferred gaseous raw materials. The process utilizes raw material which in other processes suffer particular disadvantages.

The solid oxygen carrier employed in place of air in accordance with this invention is oxidized copper by which term is meant CuO, $Cu_2O$, mixtures of CuO and $Cu_2O$ and the normally solid solutions of CuO and $Cu_2O$. Depending upon the temperature employed in the oxidation reaction it may or may not be necessary to employ a carrier for the copper oxide. Carbonaceous materials will react with oxidized copper at temperatures in the range of 400–1000° C. However, temperatures in the range of 800–1000° C. are preferred with solid carbonaceous materials such as coke and charcoal, while with gaseous raw materials such as methane and natural gas lower temperatures in the range of 400–800° C. are preferred. At the higher temperatures, i. e. 800–1000° C. copper oxide sinters and therefore it is used with a carrier such as Alundum, silica gel, kieselguhr, etc. When oxidizing $CH_4$ with oxidized copper, however, lower temperatures are satisfactory. At these lower temperatures sintering does not occur and the carrier can be dispensed with. Yet even in this instance the presence of a certain amount of inert carrier solid, e. g. sand, can assist the operator materially from a fluidization standpoint, even though the copper does not reside in the grain of the solid itself as in silica gel. Broadly, two types of carriers can be employed: (1) materials such as Alundum or silica wherein the copper oxide may become incorporated into the grain of the carrier, and (2) materials superlative as fluidizing assistants, e. g. clay, non-fused alumina powder, spent clay catalyst from petroleum oil treatment, kieselguhr, magnesia, etc.

The solid oxidized copper may be employed in a finely-divided form and contacted with the carbonaceous raw materials either in the form of a fluidized mass or a moving bed. The carbonaceous raw materials when solid are likewise used in a finely-divided state or as a moving gravitating bed.

The fluidized state of the solid reactants affords effective contact between the solids, ideal temperature control and greatest uniformity of reactant distribution throughout the fluidized mass. As a result the process is extremely flexible and may be readily controlled at the desired degree of carbon oxidation. Since the only oxygen available in the reaction zone is bound in the form of a copper oxide, the product remains free of inert gases, such as nitrogen.

In order to obtain proper fluidization all solid reactants, both carbonaceous material and copper oxide, should be ground to a size that substantially all of it will pass through 100-mesh screen. For the best results, the ground solids should include a wide range of particle sizes, ranging upwardly from about 20 microns to about 100-mesh with a large proportion of the material between about 100- and 200-mesh.

Fluidization is accomplished in the carbon dioxide generator by means of carbon dioxide vapors produced in the reaction zone or separately introduced thereto. A portion of the $CO_2$ product is recycled to a lower portion of the reacting solids to assure fluidization over their entire height. Superficial linear flow velocities of the fluidized gases within the fluidized bed may vary between about 0.3 and 4 ft. per second for proper fluidization of most practical solid reactants in the particle sizes mentioned above.

Spent solid copper oxide is intermittently or continuously reoxidized with air in a separate reactor and returned stripped of air and combustion gases and fluidized in $CO_2$ to the $CO_2$ generation zone. The spent oxygen carrier preferably consists principally of copper contaminated with unreacted CuO and $Cu_2O$, depending upon the extent of oxidation in the $CO_2$ generator. This mixture is conducted from the $CO_2$ generation zone and contacted in the fluidized state with air in a combustion zone to be reoxidized principally to CuO which is thereafter returned to the $CO_2$ generation zone. Since the reoxidation reaction in the burner is highly exothermic, all or at least a substantial part of any heat required to bring the carbonaceous material up to reaction temperature is supplied to the carbon dioxide generator in the form of sensible heat of reoxidized copper oxide.

It has been found that carbonaceous materials will react with copper oxide at temperatures in the range of 400° C. to 1000° C., preferably 700–1000° C. For example, CuO (on a carrier) reacts with retort coke at temperatures as low as 800° C. but preferably in the range of 800–950° C. for desired reaction rates. Reaction between CuO and wood charcoal is satisfactory at about 700° C., while methane reacts with CuO alone or supported on silica gel or Alundum, etc. at temperatures as low as 400° C. Successful production of $CO_2$ has been achieved by reacting methane with CuO (without a carrier) at temperatures in the range of 600° C. to 850° C. but an upper limit of 800° C. is preferred for this system. One can operate at temperatures below 600° C. but reaction rates fall off appreciably. In all instances the upper temperature limit to be employed is governed by the sintering temperature of the copper oxide. For this reason temperatures above about 1000° C. are to be guarded against if not avoided altogether.

The reaction may be carried out in a two-vessel or three-vessel system employing fluidized solids, or the reaction may take place in a moving-bed or soaker-type reactor.

The reoxidation of the spent copper oxide may be carried out, while avoiding sintering, at temperatures in the range of the reaction temperatures, i. e., not above about 1000° C.

In order to assure high reaction rates and to carry carbon oxidation in the $CO_2$ generator as far as possible, it is preferable to employ a substantial stoichiometrical excess of copper oxide over the oxidizable carbon present. Even if there should be unconverted carbon in the generator, the production of carbon monoxide therefrom will be negligible. Any carbon monoxide formed reacts rapidly with copper oxide to produce $CO_2$, but the carbon reacts only slowly with the $CO_2$ thus produced at the temperature in the generator. In other words, the carbon will not react rapidly enough with the $CO_2$ produced to form CO in serious amounts.

The nature of the present invention will appear more clearly from the following detailed description of the accompanying drawings in which each figure is a front elevation in diagrammatic form of one type of plant apparatus suitable for the practice thereof.

Figure 1 represents a two-vessel system employing fluidized solids. The system is adaptable to any form of carbonaceous material.

Figure 2 represents the moving-bed or soaker-type reactor employed with solid carbonaceous materials.

Figure 3 represents a system employing alternate moving beds of solid carbonaceous material and copper oxide.

Figure 6:
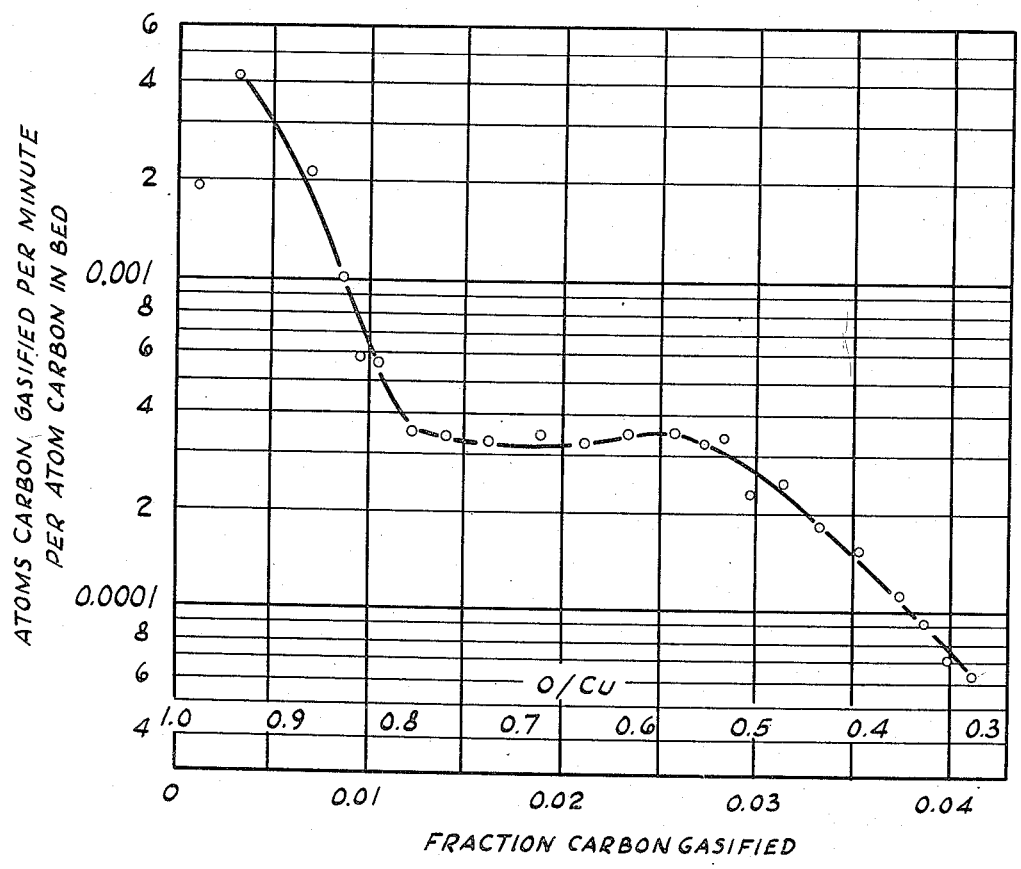

Referring to Figure 1, numeral 1 represents a carbon dioxide generator into which finely-divided carbonaceous material, such as coke, is led from hopper 2 via line 3. To aid in the flow of the carbonaceous material into vessel 1 a small amount of an aerating gas, such as carbon dioxide, may be added through line 4. Numeral 5 represents a hopper containing finely-divided solid copper oxide. The finely-divided oxide enters an upper portion of oxidation zone 7 via line 6. In initiating the process hot combustion gases from an auxiliary source (not shown) are introduced into vessels 7 and 1 and then, while continuing the flow of hot gases, copper oxide is added to vessel 7 until the vessel is properly charged and the oxide heated. The hot oxide collects in withdrawal well 24 and is withdrawn from vessel 7 and passed under the pseudo-hydrostatic pressure in a fluidized condition via line 9 into generator 1, preferably at an upper level. In generator 1 a temperature of 800° C. to 1000° C., preferably 900° C. to 950° C., is maintained. When feed of coke through line 3 is initiated, reaction occurs between the coke and copper oxide forming $CO_2$ at the prevailing reaction temperature.

The ratio of the rate at which carbonaceous feed should be fed to vessel 1 relative to the rate of feed of copper oxide to the same vessel is determined primarily by the chemical reactivity of the carbonaceous material. Thus, if one uses ordinary retort coke as the feed through line 3, in order to get satisfactory capacity of $CO_2$ production from reactor 1, the coke must be fed in large stoichiometric excess over the oxygen available in the entering copper oxide. This does not mean that all the oxygen of the copper oxide will be consumed in vessel 1. The rate of flow of the coke, relative to the oxide, must be controlled so that there is unreduced copper oxide in the solids leaving through line 17. Along with this oxide, however, will be found a considerable amount of unreacted coke. This coke will be consumed in vessel 7, markedly increasing heat generated there. If, however, the carbonaceous material employed is a highly active wood charcoal or a material such as methane, in order to maintain at least a small amount of residual copper oxide in the effluent solids from 1, the ratio of carbonaceous feed to oxygen in the oxide will be far lower than in the case of coke and, particularly in the case of a material such as methane, which will be introduced at the bottom of 1, it will be less than the stoichiometric amount.

In operating, using finely-divided coke as the carbonaceous material and CuO on silica gel as the oxidizing agent, generator 1 contains above grid 35 a fluidized mass consisting substantially of CuO introduced via line 9 at a point above the uppermost tray 43 and overflowing through overflow weirs 44 to the lower trays 43. The oxide has a particle size generally of 100 to 200 mesh. The temperature of the oxide in the generator is held at about 800° C. to 1000° C. Temperature control of the exothermic reaction occurring in the generator 1 is effected in one alternative by means of a cooling medium circulating in the cooling coils 33 located on one or more plates of the vessel 1.

The generator unit is best started up, as previously related, by introduction into the bottom thereof of hot combustion gases for both fluidization and heat supply. When the temperature is brought up sufficiently so that active interaction of the coke and copper oxide will set in, recycle of cooled top gas from vessel 1 to the bottom of the vessel for fluidization is started and coke introduced. This soon purges gases other than $CO_2$ from the unit. However, external $CO_2$ may, if desired, be introduced to expedite this purging and fluidization. In order that the carbon contained in the coke be substantially completely converted to $CO_2$ a staged system is provided. For this purpose generator 1 contains trays, bubble plates, or other staging device 43 provided with overflow levels or downcomers 44 at intervals throughout the vessel. The number of trays, etc. may be varied according to the production capacity desired of the vessel and the extent of the oxidation required. Although staging has been illustrated by the use of trays and downcomers, any manner of minimizing the mixing of solids entering and leaving the generator may be employed. The fluidized materials entering the generator through lines 3 and 9 build up on the tray until the level of the overflow is reached, after which the fluidized materials pass downwardly in succession to the next lower level. The depth of the bed on each tray is preferably about 2 to 3 feet. The flow of fluidized materials occurs countercurrent to the upward flow of fluidizing gas entering the vessel through line 31. However, the flow rate of the gas is controlled so as not to interfere with the overall downward flow of the fluidized solids.

Substantially pure $CO_2$ amounting to as much as 0.2 mol. per atom of carbon in the coke charged and containing suspended solids is withdrawn overhead from generator 1, passed through cyclone 10, and recovered through line 11 substantially free of entrained solids. The recovered gas is further worked up by compression and/or absorption by conventional means not shown. Solids separated in cyclone 10 may be returned to the fluidized mass through pipe 12. Particles of undesirably small size or excess may be discarded through line 13.

Part of the $CO_2$ produced is removed from line 11 via line 14 and introduced after cooling into the bottom of generator 1, with the aid of blower 45 to maintain fluidized conditions throughout the solids in the generator. Purge lines 15 and 16 equipped with valves are provided to introduce purge gas, such as $CO_2$ into line 9, freeing the solid phase flowing therethrough of excess air and combustion gases. The energy required to lift the purged solid into vessel 1 is supplied by means of $CO_2$ introduced via line 25.

The spent solids contained in vessel 1 are removed at a rate which will secure the oxidation of the coke to $CO_2$ in vessel 1 to the proper point. They are then passed under the pseudo-hydrostatic pressure of the fluidized mass through withdrawal well and standpipe 17 with the assistance of dilution air entering through line 18 and carried into an upper portion of regenerator 7 via line 19. Additional aerating gas may be supplied through lines 32 and 34. Standpipe 17 may be enlarged in area so as to serve as a soaker in order to more completely remove carbon from the withdrawn solids. The solid material thus removed contains reacted copper oxide in the form of Cu, $Cu_2O$ and also some unconverted CuO, carbon, and ash. The amount of carbon carried out through line 17 into regenerator 7 depends upon the reactivity of the carbon toward copper oxide, which depends largely upon the character of the carbonaceous material. However, the amount of carbon leaving generator 1 is preferably low, for example, about 0.1 to about 1 weight percent of the fluidized copper oxide recycled to the regenerator. By and large, the more carbon put through generator 1, other operating conditions unchanged, the more $CO_2$ is produced; however, the more carbon must be burned in regenerator 7. Where the demand for pure $CO_2$ is equivalent to only a limited fraction of the carbon in the fuel which must be burnt to get heat required for other processes, as in a boiler plant, running high carbon content in generator 1 can be very advantageous. Thus, even using a highly inert retort coke of low reactivity, by carrying about 3% of carbon in the oxide leaving generator 1, one can produce over a third of a ton of pure $CO_2$ per day per square foot of cross section in that unit with a net bed depth in it of 40 feet, at atmospheric pressure and an operating temperature of 1000° C. Even with no staging in vessel 1, about 25% of the carbon in the fuel is obtained in the form of pure $CO_2$ from generator 1, the rest being used for heat production in 7. The heat is recovered in coil 26, which functions best as the water tubes of a boiler. With more reactive carbons one can operate generator 1 at lower temperatures, secure larger productions of $CO_2$ from it, reduce its height, recover far higher fractions of the total carbon of the fuel as pure $CO_2$ from vessel 1, or combine these advantages as seems most desirable under any specific set of circumstances.

High ash content carbonaceous material causes rapid build up of ash in the copper oxide to be recycled and this ash build up is not desirable. This ash may be removed, e. g., by conventional gas elutriation equipment, applied to material withdrawn continuously from line 29 or by insertion of the separating equipment in line 20. In either case the recovered copper oxide is returned to the system through feed mechanism 9.

The hot gases emerging from regenerator 7 via line 20 are sent to the waste heat boiler system. In regenerator 7 the carbon carried over from generator 1 is burned with air entering predominantly through line 21 and the spent copper oxide becomes reoxidized predominantly to CuO. A temperature of 800° C. to 1000° C. is maintained in regenerator 7 and the reaction proceeds according to the equation: $2Cu_2O + O_2 \rightarrow 4CuO$.

The superficial linear gas velocity within regenerator 7 is preferably maintained at about 0.5 to 3.0 ft. per second to establish an apparent bed density up to about 70 to 80 lbs. per cubic ft. for unsupported metal oxide and a bed height between grid 22 and level 23 of about 5 to 15 ft.

The reoxidized copper oxide is withdrawn under the pseudo-hydrostatic pressure of the fluidized mass via withdrawal well and standpipe 24, and returned to generator 1 via line 9 entering near the top thereof. Aerating lines 15, 16, and lift line 25 equipped with valves are provided for introduction of purge and fluidizing gas respectively such as $CO_2$ or steam to strip and lift the solid phase to vessel 1 where the cycle is repeated. Carbon dioxide introduced through lines 15 and 16 serves to purge the fluid of any remaining traces of nitrogen and air which may be contained therein, as it is desirable to keep all but traces of nitrogen from generator 1. Hot spent gases containing excess air, nitrogen, etc. are removed from regenerator 7 via line 20 and are withdrawn from the system and sent to waste heat recovery.

The maximum temperature which can be employed anywhere in the system is that set by the tendency of the recycling solids to sinter. This is influenced by the impurities, e. g., the composition of the ash of the fuel actually used. Consequently, this maximum allowable temperature must be determined for the case in hand. Once it is so determined, the operation must be controlled to keep within this limit. Thus, the combustion in vessel 7 generates a large quantity of heat. The temperature in that vessel must be kept down by controlling operation of cooling coil 26, or preferably by controlling solid circulation rate through solid cooler 39. In the latter case a portion of hot solids is withdrawn from vessel 7 via withdrawal well and standpipe 33 and conveyed with the assistance of lift gas, preferably air entering through pipe 30, through solid cooler 39 operating as a waste heat boiler. The cooled solids are returned to vessel 7 through line 40. Heat is also evolved in vessel 1. Its temperature may be controlled by coils 33, but, alternatively, if vessel 7 is operated at a temperature somewhat below that at the outlet of vessel 1 and sufficient solids be recycled through the system, the use of coil 33 may be dispensed with. It is within the scope of this invention to add to the copper oxide entering generator 1 a small amount of other solid materials such as alkaline carbonates and oxides which catalyze the reaction in generator 1. Even inert solid heat carriers may be added.

Withdrawal wells and standpipes 17 and 24 in vessels 1 and 7 respectively are located as far as possible from the end of the standpipes supplying the charges to the respective vessels. Vessels 1 and 7 are provided with cyclone separators 10 and 27 for removal of finely-divided material from the outgoing gases, such as copper oxide or carbon fines and ash. The cyclone separators are equipped with dip legs 12 and 28 respectively for return of solids to the dense bed. Materials which are too small in size to remain fluidized are withdrawn via lines 13 and 29 respectively. This material will also contain some ash produced in the system. Any fly ash not retained by the separators can be removed from the gas streams leaving the vessels through lines 11 and 20 respectively by suitable means, such as scrubbing, if desired.

The fluidized solids in vessels 1 and 7 are maintained at an apparent density which may go up to 70 to 80 lbs. per cubic ft. When a carrier is employed with the copper oxide the apparent density approaches the lower value.

Once the process is in operation the only additional copper oxide required is make-up material to supplant that which becomes too fine to fluidize or which is lost by dilution with ash.

The system described may be operated at atmospheric or superatmospheric pressure. It is preferred to operate the generator under superatmospheric pressure and the regenerator under atmospheric pressure.

The apparatus described in Figure 1 is also ideally suited for the conversion of gaseous and gasifiable hydrocarbons to $CO_2$. Such hydrocarbons, e. g., methane, may be introduced into vessel 1 via line 36 controlled by valve 37. The hydrocarbon gas passes upwardly through grid 35 and contacts the copper oxide. In this case counterflow of solids and gas in vessel 1, though still desirable, is unnecessary and bed depth in generator 1 can be as low as a few feet. However, it is very desirable to maintain a considerable excess flow of CuO through vessel 1 relative to the $CH_4$ fed to assure the presence of CuO throughout the bed and in the solids effluent from it. At the temperature of the copper oxide the hydrocarbon reacts with it to produce $CO_2$ and $H_2O$ which emerge from vessel 1 via line 11. The water is removed from the $CO_2$ by conventional means not shown.

Solids circulation between vessels 1 and 7 may also be accomplished by arranging the vessels at different levels and using standpipes and dilute solids in gas suspensions to accomplish downward and upward flow respectively in a manner known in the art of fluid solids handling.

It will be understood that the gases used for fluidizing the various solids in transfer lines and for purging purposes, should be selected so as not to interfere with the reactions intended, for example, air may be employed as a fluidizing means supplied in lines 18, 32 and 34. However, carbon dioxide, steam, CO, $H_2$, water gas or methane is used as the fluidizing gas in lines 15, 16, 25 and 31. These gases consist solely of the elements carbon, hydrogen, and oxygen and are all converted under the reaction conditions in generator 1 to $CO_2$ and/or water vapor. Air or nitrogen is not to be used as the fluidizing gas at the latter points since it is not desirable to contaminate the $CO_2$ product with nitrogen.

While a two or more vessel system of the type illustrated is essential for a continuous production of $CO_2$, it is noted that intermittent operation carried out in a single vessel in a "make and blow" manner is likewise within the scope of the present invention. In this case the "make" period will be operated substantially at the conditions outlined above for generator 1 and the "blow" period at those conditions outlined for regenerator 7 as will be readily understood by those skilled in the art.

Figure 2 represents a diagrammatic sketch of apparatus employed in carrying out the process with the soaker-type or moving bed reactor. Referring to Figure 2, numeral 1 represents a reaction vessel to the upper end of which are added carbonaceous solid via line 2 and hot copper oxide, e. g. CuO, via line 3. It is also possible to mix the two solids before introduction into vessel 1.

The solids are allowed to fill the vessel and thereafter flow through the vessel at a predetermined rate controlled by the operation of valve 9. The solids undergo reaction during passage downwardly in the vessel 1 according to the equation: $C+4CuO \to CO_2+2Cu_2O$. The $CO_2$ generated passes up through the solids and is removed via line 4. In vessel 1 the solids settle at a predetermined rate without turbulence or with only a minimum amount of turbulence. To assure complete conversion of carbon provision is made for the introduction of small amounts of $CO_2$ gas into the bottom of the reaction vessel from line 4 via line 7 and pump 8. The reduced copper oxide is removed from vessel 1 via line 5 at a predetermined rate and is conveyed to a regenerator not shown by the assistance of aerating gas such as air introduced via line 6. The regeneration operation and return of reoxidized solids to line 3 is the same as that described in connection with Figure 1.

Figure 3 represents the alternate bed type of reactor. In Figure 3 alternate beds of copper oxide contained in oxide chambers 1 are superimposed upon beds of carbonaceous solids such as charcoal contained in carbon chambers 2, etc. In initiating the process each of the oxide chambers 1 is filled with hot copper oxide entering the uppermost chamber via line 5 and passing via line 7 to the next lowermost chamber, etc. Similarly the solid carbonaceous material enters uppermost carbon chamber 2 via line 6 and proceeds to flow downwardly via line 8 until each of the carbon chambers contains the desired level of carbonaceous material. When the process has been initiated copper oxide and carbonaceous solid are fed to the respective chambers at a uniform rate determined by the rate of withdrawal of the solids from the lowermost carbon and oxide chambers respectively. In starting up the process $CO_2$ is produced in the lowermost oxide chamber, e. g. by passing a mixture of CO and $CO_2$ via line 3 into the lowermost oxide chamber 1. Or, charcoal may be reacted with an excess of copper oxide in the lowermost oxide chamber. The gases pass upwardly through the oxide bed during which passage the CO is converted substantially to $CO_2$. The $CO_2$ stream is taken off the oxide chamber via line 4 and is introduced into the bottom of the lowermost carbon chamber 2. The $CO_2$ passes upwardly through the bed of carbonaceous material and is reduced to a mixture of CO and $CO_2$ by the reaction:

$$CO_2+C \to 2CO$$

This mixture of CO and $CO_2$ is withdrawn via line 12 and is introduced into the bottom of the next lowermost oxide chamber whereby the cycle is repeated. As many pairs of alternate beds may be employed as desired. The final $CO_2$ product is withdrawn via line 4 overhead from the uppermost oxide bed thus assuring the absence of CO in the final product. Spent copper oxide is withdrawn from lowermost oxide chamber via line 9 and sent to a regenerator as described in connection with Figure 1. The hot regenerated copper oxide is re-introduced into the reaction system via line 5. A continuous supply of carbonaceous material is furnished to the system via line 6. Any unreacted carbon from the lowermost carbon chamber is withdrawn via line 15 and returned via line 10 to supply line 6. Ash build-up is prevented by periodic withdrawal of part of the carbon via line 13. In the system described in Figure 3 mixing of the copper oxide and solid carbon is entirely prevented.

The initial gaseous mixture of CO and $CO_2$ fed to the reaction system is obtained by oxidizing carbonaceous material with copper oxide. Once the reaction is under way part of the CO and $CO_2$ mixture leaving one of the carbon chambers may be bled off and introduced into the lowermost oxide chamber, e. g. via line 14.

The invention will be illustrated by the following examples in which coke was reacted with CuO deposited on a silica gel carrier in a system fluidized by $CO_2$.

Run No. 1

[Temperature—880° C. to 906° C.; pressure in generator—1.171 atm. (aver.); superficial velocity—0.525 ft./sec.]

| Time (min.) | Average temp., °C. | $CO_2$, percent | $O_2$+CO, percent |
|---|---|---|---|
| 0 | 888±3 | | |
| 1.25 | | | |
| 2.5 | 880±4 | 98.36 | 0.31 |
| 4.5 | | 98.39 | 0.29 |
| 6.5 | 878±7 | 98.37 | 0.335 |
| 10.0 | 887±6 | 98.43 | 0.30 |
| 13.5 | 891±4 | 98.49 | 0.26 |
| 18.0 | 900±5 | 98.68 | 0.095 |
| 22.0 | 902±4 | 98.57 | 0.16 |
| 25.0 | 903±2 | 98.55 | 0.14 |
| 32.5 | 907±7 | 98.22 | 0.415 |
| 37.5 | 897±2 | 97.69 | 0.91 |
| 42.5 | 897±2 | 97.07 | 1.42 |

Run No. 2

[Temperature—950° C. to 965° C.; pressure in generator: 1.095 atm (aver.); superficial velocity: 0.775 ft./sec.]

| Time (min.) | Average temp., °C. | $CO_2$, percent | $O_2$+CO, percent |
|---|---|---|---|
| 0.0 | 957±1 | 0.0 | 0.0 |
| 0.5 | | | |
| 1.0 | | | |
| 2.0 | | 94.4 | 4.65 |
| 4.0 | | 98.3 | 0.810 |
| 5.5 | 957±1 | 99.0 | 0.133 |
| 8.0 | 954±2 | 98.9 | 0.230 |
| 11.0 | | 99.0 | 0.150 |
| 18.5 | | 99.0 | 0.104 |
| 21.5 | 956±0 | 98.3 | 0.811 |
| 24.5 | 955±2 | 99.0 | 0.101 |
| 30.0 | | 99.0 | 0.180 |
| 34.0 | 959±2 | 99.0 | 0.122 |
| 39.0 | | 99.0 | 0.129 |
| 46.5 | 953±1 | 99.0 | 0.169 |
| 54.5 | | 99.0 | 0.122 |
| 61.5 | 961±1 | 99.0 | 0.130 |
| 70.17 | | 98.8 | 0.424 |
| 75.75 | 960±1 | 98.7 | 0.479 |
| 82.8 | | 98.1 | 1.03 |
| 88.3 | 959±1 | 98.0 | 1.18 |
| 93.17 | | 97.5 | 1.67 |
| 100.25 | 953±0 | 97.2 | 2.01 |
| 113.8 | | 96.8 | 2.38 |
| | 956±0 | 96.4 | 2.86 |

Run No. 3

[Temperature—835° C. to 856° C.; pressure in generator: 1.095 atm. (aver); superficial velocity: 0.524 ft./sec.]

| Time (min.) | Average temp., °C. | $CO_2$, percent | $O_2$+CO, percent |
|---|---|---|---|
| 0.0 | 850±½ | 0.0 | 0.0 |
| 0.5 | | | |
| 1.5 | 836±3 | 98.79 | 1.07 |
| 3.0 | | | |
| 3.5 | 835±0 | 98.81 | 1.02 |
| 5.5 | 837±0 | 98.78 | 0.050 |
| 7.5 | 834±1 | 98.60 | 0.217 |
| 12.5 | 844±½ | 98.63 | 0.178 |
| 18.5 | 849±¾ | 98.70 | 0.095 |
| 26.25 | | 98.59 | 0.205 |
| 34.5 | 852±½ | 98.67 | 0.095 |
| 41 | | 98.62 | 0.143 |
| 48 | 851±½ | 98.66 | 0.085 |
| 54 | | 98.58 | 0.152 |
| 58 | 849±½ | 98.70 | 0.025 |
| 60.5 | | | |
| 68.5 | 850±½ | 98.49 | 0.220 |
| 77.5 | | 98.08 | 0.620 |
| 88.25 | | 96.97 | 1.71 |

These are batch runs, data of which are more informative as to the characteristics of the reactions. The weight percent copper, expressed as metal, in the impregnated gel at the start of the runs was 12.2%. The bed densities were about 21 pounds per cubic foot, on account of the nature of the carrier. The initial charges are shown in the following table.

|  | Lbs. carbon per cu. ft. bed | Lbs. available oxygen per cu. ft. bed |
|---|---|---|
| Run No. 1 | 1.52 | 0.422 |
| Run No. 2 | 0.392 | 0.578 |
| Run No. 3 | 3.32 | 0.558 |

The net $CO_2$ synthesis rates for Runs 1, 2, and 3 are shown respectively in Figures 4, 5, and 6. The high initial rates, which, however, fall off rapidly, are believed to be due to the fact that copper oxides high in oxygen (down to an atomic ratio of O:Cu of about 0.7 to 0.8) exert a higher partial pressure of oxygen than oxides containing less oxygen. There follows a period of quite constant rate, but the rate again starts to drop in the neighborhood of an O:Cu ratio of about 0.5. Beyond this point also the CO content of the gas starts to rise sharply.

At the start of the plateau of Figure 4 (Run No. 2), the net production rate of $CO_2$ was 2.87 cu. ft. (measured at standard conditions) per hour per cu. ft. of bed. This figure was low because of the low reactivity of the coke used. Carbons such as charcoal, of high reactivity, will give many fold this rate of $CO_2$ synthesis under conditions otherwise the same.

While the foregoing description and exemplary operations have served to illustrate specific applications and results of the invention, other modifications obvious to those skilled in the art are within the scope of the invention. Only such limitations should be imposed on the invention as are indicated in the appended claims.

What is claimed is:

1. A process for producing substantially pure $CO_2$ which comprises contacting a carbonaceous material in a reaction zone with finely divided solid copper oxide, maintaining the copper oxide in a uniform dense, turbulent fluidized state by means of $CO_2$ separately injected into the reaction zone, maintaining a temperature of 400 to 1000° C. in the reaction zone whereby reaction occurs between the carbonaceous material and the copper oxide to produce $CO_2$ and a reduced copper oxide, removing a gaseous stream of substantially pure $CO_2$ from the reaction zone, separately withdrawing a solids stream of reduced copper oxide from the reaction zone, reoxidizing the withdrawn reduced copper oxide in a separate oxidation zone by combustion with air, cooling the reoxidized copper oxide, purging the reoxidized copper oxide of air and gaseous combustion products by means of $CO_2$ gas and returning the reoxidized oxide fluidized in $CO_2$ to the reaction zone.

2. A process according to claim 1 in which the carbonaceous material is a finely divided solid and in which the reaction temperature is maintained in the range of 800° C. to 1000° C.

3. A process according to claim 1 in which the carbonaceous material is a gaseous hydrocarbon and in which the reaction temperature is maintained in the range of 600–800° C.

4. A process according to claim 1 in which the copper oxide is deposited on an inert solid carrier.

5. A process for the production of substantially pure $CO_2$ which comprises contacting finely divided coke in a reaction zone with finely divided solid copper oxide deposited on silica gel, maintaining the coke and oxide in a dense, turbulent, fluidized state in the reaction zone by means of $CO_2$ gas separately introduced thereto, maintaining a temperature of 800 to 1000° C. in the reaction zone whereby the coke is oxidized to $CO_2$ and the copper oxide is reduced, removing a gaseous stream of substantially pure $CO_2$ from the reaction zone, separately removing a solids stream of reduced copper oxide from the reaction zone, reoxidizing the reduced oxide in a separate oxidation zone by combustion with air, cooling the reoxidized copper oxide, purging the reoxidized copper oxide of air and gaseous combustion products by means of $CO_2$ gas, and returning the reoxidized copper oxide to the reaction zone fluidized in $CO_2$.

6. A process for the production of substantially pure $CO_2$ which comprises contacting methane in a reaction zone with finely divided solid copper oxide deposited on silica gel, maintaining the methane and oxide in a dense, turbulent, fluidized state in the reaction zone by means of $CO_2$ gas separately introduced thereto, maintaining a temperature of 400 to 800° C. in the reaction zone whereby the methane is oxidized to $CO_2$ and the copper oxide is reduced, removing a gaseous stream of substantially pure $CO_2$ from the reaction zone, separately removing a solids stream of reduced copper oxide from the reaction zone, reoxidizing the reduced oxide in a separate oxidation zone by combustion with air, cooling the reoxidized copper oxide, purging the reoxidized copper oxide of air and gaseous combustion products by means of $CO_2$ gas and returning the reoxidized copper oxide to the reaction zone fluidized in $CO_2$.

WARREN K. LEWIS.
EDWIN R. GILLILAND.

References Cited in the file of this patent

FOREIGN PATENTS

| Number | Country | Date |
|---|---|---|
| 936 | Great Britain | 1862 |
| 10,759 | Great Britain | 1887 |
| 12,155 | Great Britain | 1892 |
| 6,835 | Great Britain | 1896 |
| 587,774 | Great Britain | May 6, 1947 |
| 597,221 | Great Britain | Jan. 21, 1948 |

OTHER REFERENCES

"Improved Solids-Gas Contacting by Fluidization," by J. C. Kalbach, June 1944 Chem. and Met. Eng., pages 94–97.